United States Patent Office 2,882,246
Patented Apr. 14, 1959

2,882,246

POLYETHYLENE-WAX COMPOSITION AND PROCESS OF BLENDING SAME

Gerald T. Leatherman and Clyde V. Detter, Bartlesville, Okla., assignors to Phillips Petroleum Company, a corporation of Delaware No Drawing. Application June 1, 1954
Serial No. 433,802

12 Claims. (Cl. 260—28.5)

This invention relates to a novel wax composition having improved properties, especially increased melting or softening point. In one aspect, it relates to a method of producing such a composition.

It is known in the art to utilize waxes for protective coating, sealing compositions, and for the production of molded articles. Molded articles prepared from wax are known to soften and lose their shape at moderately elevated temperatures, e.g., from 100 to 150° F. The prior art has proposed various additives to increase the melting point of wax.

This invention provides an improved wax composition containing an additive which imparts to the composition a higher melting point than any other additive which we have tested.

According to this invention, there is provided an improved composition comprising a major proportion of wax and a minor proportion of a unique type of olefin polymer, namely a polymer produced by polymerizing an olefin in the presence of a catalyst comprising chromium oxide.

The preparation of the polymers used as wax additives according to this invention is more fully described in the copending application of J. P. Hogan and R. L. Banks, Serial No. 333,576, filed January 27, 1953, now abandoned. According to that application, a normally solid polymer is produced by polymerizing a 1-olefin, having a maximum chain length of 8 carbon atoms and no chain branching nearer the double bond than the 4-position, in the presence of a chromium oxide polymerization catalyst at moderately elevated temperatures and pressures, e.g. 150 to 450° F. and 100 to 700 p.s.i. The catalyst can be prepared by depositing chromium oxide, preferably containing hexavalent chromium, on a suitable support such as at least one oxide selected from the group consisting of silica and alumina. The support is not necessarily inert; it can contribute to the total catalyst activity. Commercially available silica-alumina catalysts are satisfactory supports. One such support comprises 10 weight percent alumina and 90 weight percent silica. The reactant olefin is preferably reacted in solution in a solvent such as i-pentane, n-hexane, n-heptane, i-octane, or n-decane, i.e., in general, a liquid hydrocarbon which is nonreactive under the polymerization conditions. Suitable olefins are ethylene, propylene, 1-butene, butadiene, 1-pentane, 1-hexene and 4-methyl-1-hexene. The polymers prepared by this method differ significantly from those previously known. They have higher softening points and appear to have predominantly straight-chain structure and a different type of unsaturation from those previously known.

For the purposes of this invention, the additive used is a normally solid polymer, produced by the process of Hogan and Banks, and having a molecular weight in the range 3,000 to 150,000, preferably 5,000 to 60,000. The polymer has a melting point of at least 235° F. The polymer most frequently utilized is a polymer of ethylene, although normally solid polymers of other olefins, as above described, can be used.

The polyethylenes used according to this invention have a melting point in the range 235 to 260° F., a density in the range 0.92 to 0.97, an intrinsic viscosity in the range 0.2 to 1.2, and are characterized by the substantial absence of so-called "branched-vinyl" unsaturation as shown by infra-red spectra. Prior art polyethylenes are characterized by the fact that their unsaturation is predominantly of the branched-vinyl type. The unsaturation in the polyethylenes utilized in this invention is preponderantly of the so-called "trans-internal" and/or "terminal vinyl" type, in contradistinction to prior art polyethylenes. The above-mentioned types of unsaturation are represented by the following formulae.

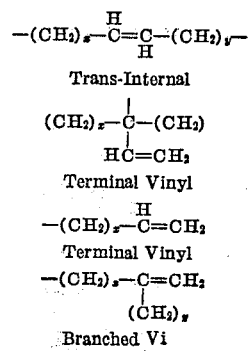

wherein $x$ and $y$ are integers.

The proportion of polymer used in the wax composition is ordinarily in the range 0.1 to 10 weight percent, preferably 1 to 8 weight percent, and more preferably 3 to 7 weight percent.

The wax used in the composition of this invention can be any known wax which is useful for the fabrication of molded articles. Examples are hydrocarbon waxes such as paraffin wax; ester waxes, such as candelilla wax, carnauba wax, montan wax, spermaceti and similar waxes. It is preferred to use a wax having a melting point of at least 100° F., preferably at least 125° F.

According to this invention, the wax composition can be prepared by mixing the molten constituents, and rapidly cooling, by kneading, or otherwise agitating, the constituents at elevated temperatures at or near the melting point of the wax, or by dissolving the wax and the polymer in a solvent, as previously described herein, such as a normally liquid paraffin, and evaporating the solvent.

The compositions according to this invention are particularly useful for molding to form candles, wax bottles, and other molded articles. They can also be used to make waxed paper, and other wax-impregnated fibers. They are useful as protective coatings and sealing compositions.

Example I

Two different wax compositions according to this invention were compared with wax compositions prepared from commercial polyethylenes.

Composition 1 in the following table was paraffin wax without any additive.

Compositions 2 and 3 were prepared from the same paraffin wax and two different commercial polyethylenes.

Composition 4, according to this invention, contained a polyethylene produced by contacting a 2.1 weight percent solution of ethylene in 2,2,4-trimethylpentane, in the liquid phase, with a catalyst containing approximately 2 weight percent chromium oxide deposited on a base comprising 90 percent alumina and 10 percent silica at 320 to 340° F., 420 p.s.i., and a liquid hourly space velocity of 4.4. The total reaction period was 45.3 hours.

Composition 5, also according to this invention, contained a polyethylene having a density of 0.957 and a melting point of 247±2° F. and was prepared by contacting a 2 weight percent solution of ethylene in a liquid hydrocarbon solvent with a catalyst comprising 2 weight percent chromium oxide (1.03 weight percent hexavalent chromium) deposited on an aqueous-HF-treated base originally comprising 95 percent alumina and 5 percent silica at 272° F., presure sufficient to maintain liquid-phase conditions, and a liquid hourly space velocity of 6. The fluorine content of the catalyst was 10 weight percent. The preparation of this type of catalyst is disclosed more fully in copending application Serial No. 476,306, filed December 20, 1954, now abandoned. The total conversion period was 4 hours.

Each of compositions 2, 3, 4, and 5 was prepared by heating the wax and the polyethylene together at about 250° F. to form a homogeneous-appearing blend and cooling.

The following results were obtained,

| Composition Number | Polyethylene | | Melting Point of Composition, ° F. |
| --- | --- | --- | --- |
| | Molecular Weight | Weight Percent in Composition | |
| 1 | | 0 | 134 |
| 2 | 20,000 | 4.75 | 151 |
| 3 | 5,000 | 4.75 | 198 |
| 4 | 14,550 | 4.75 | 209.5 |
| 5 | 47,340 | 4.75 | 228.0 |

The data above show that compositions 4 and 5, according to this invention, had higher melting points than compositions 2 and 3, prepared from commercial polyethylenes known in the art, and that the differences in the melting points are not predictable from the molecular weights. Compositions according to this invention, as illustrated by the foregoing data, have melting points above 200° F.

The melting points were determined by ASTM Method D-87-42, which comprises dipping a thermometer into the molten composition, cooling to solidify the composition adhering to the thermometer bulb, placing the thermometer bulb in a stream of hot air, and reading the temperature at which the first drop of melted mixture forms on the bulb.

*Example II*

A composition, according to this invention, containing 5 weight percent polyethylene and 95 weight percent paraffin wax (M.P. 130° F.) was prepared by the method of Example I. The polyethylene was prepared substantially as described in connection with composition 4 of Example I. It had a melting point of 246° F., a density of 0.957, and a molecular weight of 10,500. The composition was cast to form candles. Candles were also made from the additive-free paraffin wax. All of the candles had the same diameter, length, and shape. All of the candles were subjected to an atmosphere having a temperature of 115° F. for 75 minutes. The candles made from the pure paraffin wax bent severely, while those made from the wax-polyethylene composition of this invention showed no deformation.

Similar results are obtained when ester waxes, such as candelilla wax or spermaceti, are used in place of paraffin wax.

The molecular weights referred to herein are those determined according to the methods of Kemp and Peters, Industrial and Engineering Chemistry, 35, 1108 (1943) and Dienes and Klemm, Journal of Applied Physics, 17, 458–471 (June 1946).

The molecular weights were calculated according to the equation $$M = \frac{4.03 \times 10^3 \times N_i \times 14}{2.303}$$

wherein M is the molecular weight and $N_i$ is the intrinsic viscosity as determined for a solution of 0.2 gm. of polymer in 50 cc. of tetralin at 130° C.

While certain compositions, structures, process steps and examples are disclosed for purposes of illustration, it is clear that the invention is not limited thereto. Variation and modification are possible within the scope of the disclosure and claims to this invention, the essence of which is a composition comprising a wax containing a minor proportion of an olefin polymer produced by polymerization of an olefin in the presence of a chromium oxide polymerization catalyst, and a method of preparing such a composition by mixing the components thereof.

We claim:

1. A composition comprising a major proportion of a wax having a melting point of at least 100° F., selected from the group consisting of paraffin wax, candelilla wax, carnauba wax, montan wax and spermaceti wax, and from 0.1 to 10 percent by weight of a solid polyethylene produced by polmerizing ethylene in the presence of a catalyst consisting of chromium oxide, containing hexavalent chromium supported on at least one oxide selected from the group consisting of silica and alumina, said polyethylene having a density in the range of 0.92 to 0.97 and a melting point in the range of 235 to 260° F.

2. The composition of claim 1 in which the wax is paraffin wax.

3. The composition of claim 1 in which the wax is candelilla wax.

4. The composition of claim 1 in which the wax is carnauba wax.

5. The composition of claim 1 in which the wax is spermaceti wax.

6. The composition of claim 1 in which the wax is montan wax.

7. A process which comprises blending a wax having a melting point of at least 100° F., selected from the group consisting of paraffin wax, candelilla wax, carnauba wax, montan wax, and spermaceti wax, with from 0.1 to 10 percent by weight of a solid polyethylene produced by polymerizing ethylene in the presence of a catalyst consisting of chromium oxide, containing hexavalent chromium supported on at least one oxide selected from the group consisting of silica and alumina, said polyethylene having a density in the range of 0.92 to 0.97 and a melting point in the range of 235 to 260° F.

8. The process of claim 7 in which the wax is paraffin wax.

9. The process of claim 7 in which the wax is candelilla wax.

10. The process of claim 7 in which the wax is carnauba wax.

11. The process of claim 7 in which the wax is spermaceti wax.

12. The process of claim 7 in which the wax is montan wax.

References Cited in the file of this patent

UNITED STATES PATENTS

| | | |
| --- | --- | --- |
| 2,523,705 | Lovell et al. | Sept. 26, 1950 |
| 2,559,645 | Larsen et al. | July 10, 1951 |
| 2,560,773 | Lovell | July 17, 1951 |
| 2,601,109 | Fish | June 17, 1952 |
| 2,666,756 | Boyd et al. | Jan. 19, 1954 |
| 2,691,647 | Field et al. | Oct. 12, 1954 |
| 2,706,719 | Newburg et al. | Apr. 19, 1955 |
| 2,725,374 | Mosher | Nov. 29, 1955 |

OTHER REFERENCES

British Plastics, December 1943, pages 417–418.